United States Patent Office 2,830,165
Patented Apr. 8, 1958

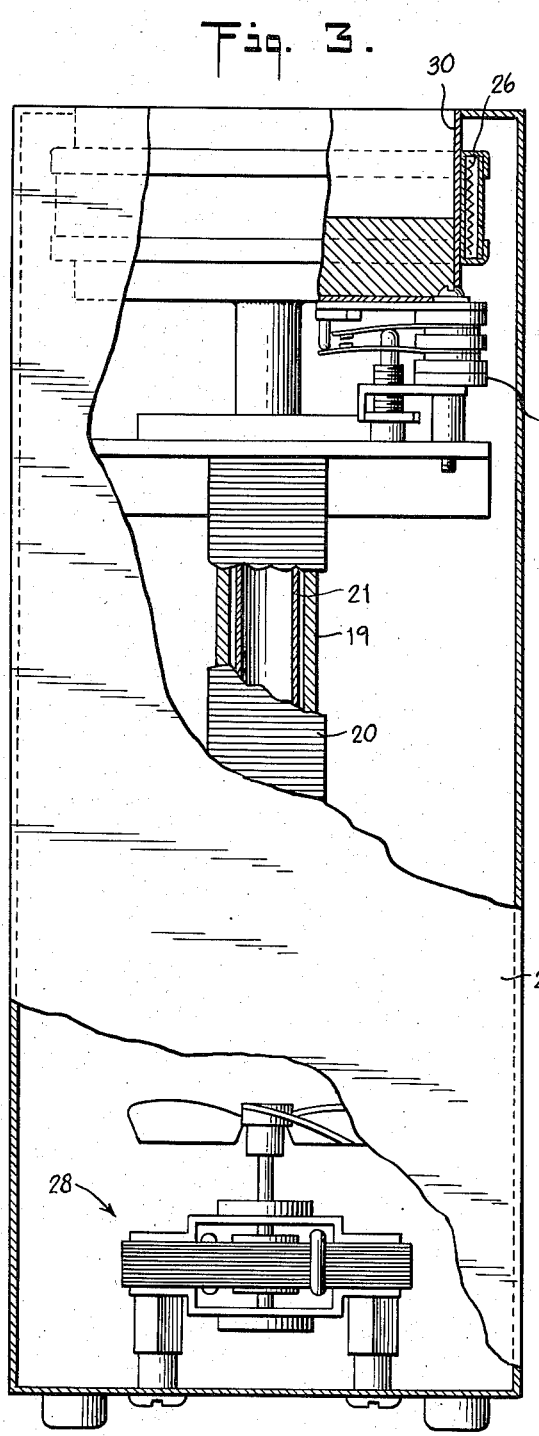
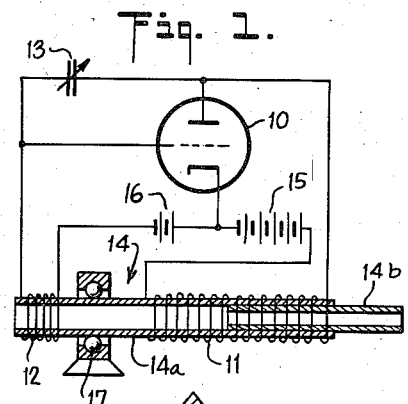
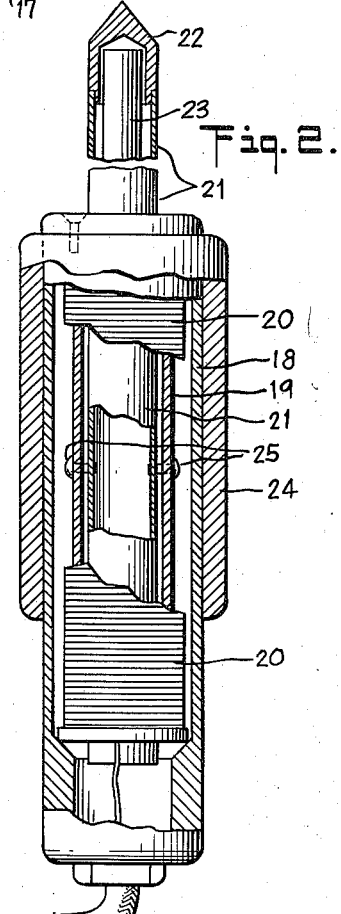
INVENTOR.
BENSON CARLIN

2,830,165

ULTRA-SONIC MAGNETOSTRICTION TRANSDUCER DEVICES

Benson Carlin, Fair Lawn, N. J., assignor to Alcar Instruments, Inc., Little Ferry, N. J., a corporation of New Jersey Application December 21, 1955, Serial No. 554,492

5 Claims. (Cl. 219—26)

The present invention relates generally to ultra-sonic transducers and more particularly to magnetostrictive vibratory devices.

Magnetostriction oscillators are based on the phenomenon that when a bar of magnetic material conducts magnetic flux it lengthens or contracts longitudinally. Many metals and alloys exhibit mangetostriction but it is most pronounced in alloys of nickel, chromium and iron. When the magnetostriction rod or tube is placed in a coil carrying alternating current, it vibrates longitudinally at a frequency determined by the alternating current. If this frequency is the resonant frequency of the rod mechanically, the amplitude of the effect will be large even for very small coil currents.

It has heretofore been known to make use of a magnetostriction oscillation device to vibrate heated soldering irons for the purpose of soldering without flux. In such devices the heating element or cartridge is contained within a hollow magnetostriction rod. Since the heat produced by the element tends to inhibit the vibratory properties of the rod, it is desirable that the rod be of extended length, thereby minimizing the effect of heat thereon. However, this extension in rod length normally lowers the operating frequency of the oscillator and reduces the efficiency of the iron. Obviously, should the frequency of the iron be reduced to a point lying within the sonic range, the iron as a practical matter could not be conveniently used.

Accordingly, it is the principal object of the invention to provide a magnetostriction oscillator of ultrasonic frequency employing a relatively long rod. A significant feature of the invention resides in the use of adjustable clamping means adapted to vary the operating frequency.

More specifically it is an object of the invention to provide an efficient and compact vibratory soldering iron including a relatively long rod operating in the ultrasonic range.

Still another object of the invention is to provide an improved solder pot adapted to solder components without the use of flux and including a magnetostrictive driver element operating efficiently at a high frequency.

Yet another object of the invention is to provide a magnetostriction rod of adjustable overall length.

For a better understanding of the invention as well as other objects and further features thereof, reference is had to the following detailed description to be read in conjunction with the accompanying drawing, wherein like components in the various views are identified by like reference numerals.

In the drawing:

Figure 1 is a schematic circuit diagram of a magnetostrictive oscillator in accordance with the invention.

Figure 2 is a view partly in section of a soldering iron transducer according to the invention.

Figure 3 is a view partly in section of a solder pot transducer in accordance with the invention.

Referring now to the drawing, and more particularly to Fig. 1, the oscillator comprises an electron discharge tube 10 having cathode, grid and anode electrodes, an anode coil 11, a grid coil 12 and a variable condenser 13, the coils surrounding a magnetostriction rod generally designated by numeral 14.

Anode coil 11 is connected at one end to the anode of tube 10 and at the other end through a high voltage battery 15 to the cathode. Grid coil 12 is connected at one end to the grid and at the other end through a bias battery 16 to the cathode. Condenser 13 is connected between anode and grid to provide positive feedback. Anode current flowing through the anode coil 11 serves to polarize rod 14, the rod being adjustably clamped at a point between the ends thereof by a device 17 to be later described.

Rod 14 is constituted by two tubular sections 14a and 14b, the inner section 14b telescoping within the outer section 14a whereby the overall length of the rod may be adjusted as desired. Heretofore it has been the practice to clamp the magnetostriction rod at its midpoint (a node of its mechanical vibration), the ends being free to vibrate.

The clamp for the rod is in the form of a retaining ring providing a ball bearing support whereby the position of the clamp relative to either end of the rod 14 may be adjusted at will. This ring may include a standard means to lock the bearings to prevent displacement of the rod thereon after an adjustment has been made. When the ring is at the center of the rod, the rod will oscillate at its normal fixed frequency determined by the overall length of the tube. However, when in accordance with the invention the ring is positioned one-quarter of the overall length from one end of the rod, the rod will then oscillate at a frequency determined by doubling its one-quarter distance of one-half the total distance. In other words, it behaves like a rod of one-half the total length supported at the center. Thus a high operating frequency is obtained with a relatively long rod. By shifting the retaining ring up and back, the frequencies of oscillation of the rod may be made to vary and will always be determined by the distance approximately twice that from either end of the tube. A variable frequency transducer has accordingly been obtainde, whose frequency can be smoothly varied over a range determined by the distance between the clamp and one end of the transducer.

Referring now to Fig. 2, a soldering iron in accordance with the invention comprises a cylindrical casing 18 within which is coaxially mounted a tubular coil support 19 on which is helically wound an oscillator coil 20. Concentrically disposed within coil support 19 and spaced therefrom is a hollow magnetostriction rod 21, the rod projecting axially from one end of the casing and terminating in a soldering tip 22. Tip 22 may be formed of copper or similar material suitable for soldering.

Disposed within the rod 21 adjacent the tip 22 is electric heating cartridge or element 23, the wires therefor extending through the length of the rod. Surrounding the casing 18 is a tubular handle 24. The rod 19 is clamped at a point one-quarter the overall length spaced from the end within the casing, the clamping being effected by pins or bolts 25. The oscillating frequency of the rod is equivalent to a rod of half the length when clamped at its mid-point. In this way high-frequency vibrations are produced with a rod of extended length, and the effect of heating element 23 on the vibrations is minimized. The oscillator circuit associated with coil 20 may be of conventional design, such as shown in Fig. 1, and is tuned to oscillate at a frequency corresponding to the mechanical frequency of the rod as determined when clamping at the one-quarter way position as above disclosed.

In the solder pot shown in Fig. 3, the transducer is identical to that in Fig. 2, save that the magnetostriction rod 21 is coupled at its end to a cup-shaped solder pot 30 which is surrounded by a heater coil 26. A thermostat 27 is installed to maintain the temperature in the pot at the desired level. Also provided is a fan 28 to prevent overheating of the transducer, all the elements being enclosed within a housing 29. With this arrangement it is possible to perform dip-soldering without flux, the device being useful in the fabrication of printed circuits and the like.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A soldering iron transducer comprising a tubular magnetostriction rod, an oscillator circuit for producing a magnetic field in the ultra-sonic frequency range and including a coil surrounding said rod, means to clamp said rod at a point displaced one-quarter of the full length of the rod from one end thereof, the ends of said rod being free to vibrate, a soldering tip secured to the other end of said rod, and a heating element in said rod adjacent said tip.

2. A solder pot transducer comprising a magnetostriction rod, an oscillator circuit for producing a magnetic field in the ultra-sonic frequency range and including a coil surrounding said rod, means to clamp said rod at a point displaced one-quarter of the full length of the rod from one end thereof, the ends of said rod being free to vibrate, a solder pot attached to the other end of said rod, and a heater surrounding said pot.

3. A transducer device comprising a tubular casing, a tubular coil support, an oscillator coil surrounding said support, said support being coaxially mounted within said casing, a magnetostriction rod concentrically disposed within said support and extending axially from said casing, and means to secure said rod to said support at a point spaced from the inner end of said rod a distance corresponding to one-quarter of the full length of said rod, the ends of said rod being free to vibrate.

4. A soldering iron transducer comprising a tubular casing, a coil-supporting tubular former, an oscillator coil surrounding said former, said former being coaxially mounted within said casing, a hollow magnetostriction rod concentrically disposed within said former and extending axially from said casing, means to secure said rod to said former at a point spaced from the inner end of said rod a distance corresponding to one-quarter of the full length of said rod, a soldering tip attached to the outer end of said rod, and a heating cartridge disposed within said rod adjacent said tip.

5. A solder pot transducer comprising a tubular casing, a coil supporting tubular former, an oscillator coil surrounding said former, said former being coaxially mounted within said casing, a magnetostriction rod concentrically disposed within said former and extending axially from said casing, means to secure said rod to said former at a point spaced from the inner end of said rod a distance corresponding to one-quarter of the full length of said rod, a cup-shaped pot secured to the outer end of said rod, and a heater coil surrounding said pot.

References Cited in the file of this patent

UNITED STATES PATENTS

| Re. 19,461 | Pierce | Feb. 12, 1935 |
| 2,397,400 | Barwich | Mar. 26, 1946 |
| 2,676,236 | Birkbeck et al. | Apr. 20, 1954 |

FOREIGN PATENTS

| 713,566 | Great Britain | Aug. 11, 1954 |